(12) United States Patent
Schnittger et al.

(10) Patent No.: US 12,097,831 B2
(45) Date of Patent: Sep. 24, 2024

(54) PARKING BRAKE DEVICE

(71) Applicant: KNORR-BREMSE Systeme fuer Nutzfahrzeuge GmbH, Munich (DE)

(72) Inventors: Karsten Schnittger, Munich (DE); Max Michalski, Neubiberg (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 354 days.

(21) Appl. No.: 17/626,398

(22) PCT Filed: Jul. 9, 2020

(86) PCT No.: PCT/EP2020/069423
§ 371 (c)(1),
(2) Date: Jan. 11, 2022

(87) PCT Pub. No.: WO2021/009011
PCT Pub. Date: Jan. 21, 2021

(65) Prior Publication Data
US 2022/0250602 A1 Aug. 11, 2022

(30) Foreign Application Priority Data
Jul. 12, 2019 (DE) ............. 10 2019 118 896.2

(51) Int. Cl.
*B60T 15/04* (2006.01)
*B60T 13/38* (2006.01)
*B60T 13/68* (2006.01)

(52) U.S. Cl.
CPC .......... *B60T 15/041* (2013.01); *B60T 13/385* (2013.01); *B60T 13/683* (2013.01)

(58) Field of Classification Search
CPC ...... B60T 8/1708; B60T 8/323; B60T 13/263; B60T 13/385; B60T 13/683; B60T 7/20; B60T 15/041
See application file for complete search history.

(56) References Cited

U.S. PATENT DOCUMENTS 10,780,871 B2 * 9/2020 Riley .................... B60T 15/027
10,946,848 B2 * 3/2021 Van Thiel ............. B60T 13/683
(Continued)

FOREIGN PATENT DOCUMENTS

CN 105035056 A 11/2015
CN 107735295 A 2/2018
(Continued)

OTHER PUBLICATIONS

Hindi-language Office Action issued in Indian Application No. 202137059642 dated Jun. 16, 2022 with English translation (five (5) pages).
(Continued)

*Primary Examiner* — Bradley T King
(74) *Attorney, Agent, or Firm* — Crowell & Moring LLP

(57) ABSTRACT

A parking brake device has at least one first connection line for connection to a compressed air source and at least one second connection line for connection to a compressed air source. At least one first compressed air output line for direct and/or indirect connection to a spring brake actuator, and at least one further redundant compressed air output line for direct and/or indirect connection to a redundant brake system, are provided.

10 Claims, 16 Drawing Sheets

(56) References Cited

U.S. PATENT DOCUMENTS

| | | | |
|---|---|---|---|
| 11,440,521 B2* | 9/2022 | Van Thiel | B60T 15/043 |
| 11,858,483 B2* | 1/2024 | Van Thiel | B60T 17/221 |
| 2005/0029859 A1* | 2/2005 | Bensch | B60T 17/221 |
| | | | 303/20 |
| 2010/0025141 A1 | 2/2010 | Bensch et al. | |
| 2014/0103237 A1* | 4/2014 | Herges | B60T 15/182 |
| | | | 251/129.01 |
| 2017/0267221 A1 | 9/2017 | Hecker et al. | |
| 2018/0251111 A1* | 9/2018 | Schnittger | B60T 13/263 |
| 2018/0251112 A1* | 9/2018 | Griesser | B60T 17/004 |
| 2019/0217833 A1 | 7/2019 | Michalski et al. | |
| 2019/0217839 A1 | 7/2019 | Schnittger et al. | |
| 2019/0217842 A1 | 7/2019 | Leinung et al. | |
| 2019/0366992 A1 | 12/2019 | Kluftinger et al. | |
| 2020/0079341 A1 | 3/2020 | Van Thiel | |
| 2020/0207319 A1 | 7/2020 | Van Thiel | |
| 2020/0247381 A1 | 8/2020 | Van Thiel | |
| 2021/0245723 A1* | 8/2021 | Schnittger | B60T 13/683 |
| 2021/0316704 A1 | 10/2021 | Schnittger et al. | |
| 2022/0258712 A1* | 8/2022 | Schnittger | B60T 13/683 |

FOREIGN PATENT DOCUMENTS

| | | |
|---|---|---|
| CN | 108473123 A | 8/2018 |
| CN | 109476296 A | 3/2019 |
| DE | 100 42 215 C1 | 11/2001 |
| DE | 103 36 611 A1 | 3/2005 |
| DE | 10 2005 058 799 A1 | 6/2007 |
| DE | 10 2007 047 692 A1 | 4/2009 |
| DE | 10 2008 009 043 B3 | 5/2009 |
| DE | 10 2014 006 314 A1 | 11/2015 |
| DE | 10 2014 013 756 B3 | 2/2016 |
| DE | 10 2014 112 015 A1 | 2/2016 |
| DE | 10 2015 107 125 A1 | 11/2016 |
| DE | 10 2015 119 135 A1 | 5/2017 |
| DE | 10 2016 117 784 A1 | 3/2018 |
| DE | 10 2016 117 836 A1 | 3/2018 |
| DE | 10 2016 117 837 A1 | 3/2018 |
| DE | 10 2017 102 074 A1 | 8/2018 |
| DE | 10 2017 007 781 A1 | 2/2019 |
| DE | 10 2017 009 307 A1 | 4/2019 |
| EP | 1 504 975 A1 | 2/2005 |
| EP | 1 571 061 A1 | 9/2005 |
| EP | 2 197 715 B1 | 9/2011 |
| EP | 2 927 067 A2 | 10/2015 |
| EP | 2 794 368 B1 | 11/2015 |
| EP | 3 356 192 B1 | 7/2019 |
| JP | 2017-149263 A | 8/2017 |
| JP | 2021-59120 A | 4/2021 |
| WO | WO 2016/177475 A1 | 11/2016 |
| WO | WO 2017/134160 A1 | 8/2017 |
| WO | WO 2018/054645 A1 | 3/2018 |
| WO | WO 2018/172394 A1 | 9/2018 |
| WO | WO 2019/210964 A1 | 11/2019 |

OTHER PUBLICATIONS

Chinese-language Office Action issued in Chinese Application No. 202080050793.1 dated Mar. 29, 2023 with English translation (12 pages).

Japanese-language Office Action issued in Japanese Application No. 2022-501354 dated Apr. 4, 2023 with English translation (15 pages).

International Search Report (PCT/ISA/210) issued in PCT Application No. PCT/EP2020/069423 dated Nov. 2, 2020 with English translation (four (4) pages).

German-language Written Opinion (PCT/ISA/237) issued in PCT Application No. PCT/EP2020/069423 dated Nov. 2, 2020 (eight (8) pages).

German-language Office Action issued in German Application No. 10 2019 118 896.2 dated Apr. 24, 2020 (12 pages).

Japanese-language Office Action issued in Japanese Application No. 2022-501354 dated Aug. 1, 2023 with English translation (8 pages).

* cited by examiner

PARKING BRAKE DEVICE

BACKGROUND AND SUMMARY OF THE INVENTION

The present invention relates to a parking brake device for a utility vehicle, having at least one first connector line to a compressed air source, and at least one second connector line to a compressed air source.

Parking brake devices for utility vehicles are already known from the prior art. In the context of utility vehicles, pneumatic brake systems are used with which the spring brake cylinders of a utility vehicle, but also the brake system of a trailer, can be used.

Brake systems are already known from the prior art. DE 10 2015 107 125 A1 thus discloses a device for controlling a brake system for a utility vehicle, having a parking brake control valve for providing a parking brake function for the utility vehicle, and having a trailer control valve for providing a holding brake function and a function of the electric braking for the trailer.

DE 10 2016 117 836 A1 discloses an air preparation unit for a brake system of a utility vehicle. The air preparation unit comprises a foot brake module connector for pneumatically coupling the air preparation unit to a foot brake module of the brake system, at least one valve unit for impinging the foot brake module connector, and a control pressure apparatus and a control apparatus for actuating the valve unit.

DE 10 2016 117 837 A1 relates to an air preparation unit for a brake system of a utility vehicle. The air preparation unit comprises a control valve connector for pneumatically coupling the air preparation unit to at least control valve which for varying a brake pressure in the wheel brake cylinder is disposed upstream of the wheel brake cylinder of the brake system, an impingement valve for impinging the control valve connector with a nominal pressure, and a control apparatus for actuating the impingement valve.

DE 10 2017 102 074 A1 relates to an interface element for a vehicle that comprises electronic components, wherein the electronic components have at least one connector to at least one data interface of a utility vehicle, wherein the connector is suitable and configured for exchanging measured data and/or open-loop and/or closed-loop control data for controlling electronic components in a closed loop, wherein the electronic components furthermore have at least one integrated measuring and/or open-loop and/or closed-loop controlling unit.

WO 2016/177475 A1 relates to a device for controlling a brake system for a utility vehicle, and to a brake system.

EP 2 794 368 B1 relates to an electronically controlled pneumatic brake system for an automobile, and to an automobile having such a system.

Furthermore, DE 10 2014 112 015 A1 shows a method for controlling an electropneumatic service brake device which is activated by an electropneumatic service brake valve device, in particular of an electronic brake system of a vehicle, wherein the electropneumatic service brake valve device has a service brake activation member, as well as, within at least one electric service brake circuit of the electropneumatic service brake device, at least one electric channel having at least one electric brake encoder which for emitting activation signals as a function of the activation is able to be activated by the service brake activation member by virtue of a brake request by the driver, and having at least one electronic control device that receives the activation signals.

DE 10 2014 013 756 B3 discloses an electric equipment of a vehicle having an at least partially electric braking and steering device containing an electric or electromechanical steering device with or without a continuous mechanical connection between a steering wheel and a steering gear, as well as having an electronic steering control device and an electric steering actuator, and a service brake device which is provided as a service brake device an electropneumatic service brake device, in particular an electronic brake system or brake system electronically controlled by the brake pressure, said brake system containing an electropneumatic service brake valve device, an electronic brake control device, electropneumatic modulators, as well as pneumatic wheel brake actuators.

WO 2018/054645 A1 shows an air preparation unit for a brake system of a utility vehicle, and a method for operating an air preparation unit, wherein the utility vehicle can have a brake system that is automatically controllable by means of an electronic brake system. In the event of a failure of the electronic brake system, the automatic control of the brake system can be maintained by redundant control electronics having a separate current supply, for example.

DE 10 2008 009 043 B3 furthermore shows an electronically controlled brake system of a tractive unit which is provided for the operation of the trailer and which comprises at least one first electronic brake control circuit and one second electronic brake control circuit. The invention provides that components, such as, for example, a trailer control module or a parking brake module which are anyway present in a tractive unit, are used for controlling a pressurizing medium of brake actuators that no longer can be actuated by a defective electric brake circuit.

Existing systems, or else new brake systems, for utility vehicles are to be retrofitted or refined, respectively, with a view to trucks which will be partially self-driving or self-driving in the future. Modifications to the brake system are required to this end.

It is the object of the present invention to advantageously refine a parking brake device of the type mentioned at the outset, in particular with a view to the possibility of being able to meet the requirements of partially self-driving or self-driving trucks.

This object is achieved according to the invention by a parking brake device provided with at least one first connector line to a compressed air source, at least one second connector line to a compressed air source, at least one first compressed air output line for connecting directly and/or indirectly to a spring brake cylinder, and at least one further redundancy compressed air output line for connecting directly and/or indirectly to a redundant brake system.

The invention is based on the principal concept that an existing brake system is modified to the effect that the latter is in particular suitable for partially self-driving or self-driving utility vehicles. Added to this end is in particular a further redundant brake system which can take over in a corresponding manner in the event of a failure of the first brake system. By providing at least two compressed air connectors, it becomes possible to be able to provide a further redundancy compressed air output in any case such that at least one further redundancy plane which utilizes the parking brake device for stepless braking is present even when an already redundantly configured brake system (in particular a service brake system, for example) should fail or be defective. The further redundancy compressed air output or connector, respectively, can in particular be utilized for this function. Advantages in terms of a reduction of costs by way of systems integration result in principle. The parking brake device already today enables control electronics which have already been developed according to the highest safety requirements and are independent of the normal brake system. The electronics of a parking brake device (electronic parking brake—EPB) can thus be easily upgraded so as to form a redundant control unit for autonomous driving. For example, a component, such as the relay module of the electronic parking module, can also be readily integrated in modular EPB systems.

In principle, it is conceivable that the compressed air output line and the redundancy compressed air output line are connected to different outputs, or supply different outputs, respectively. In principle however, it is also conceivable that a common supply connector line (or supply output, respectively) is utilized, for example. In this case, both the compressed air output line and the redundancy compressed air output line would supply the same supply connector line (or supply output, respectively).

A redundant brake system is also to be understood, for example, such that the regular service brake cylinders, thus the "actual" brake of the vehicle, are actuated by way of the redundancy compressed air output line, but in a manner completely independent of the regular actuation of this brake. It is also conceivable that a completely redundant brake system is constructed, thus by additional brake cylinders or other suitable brake systems, for example.

In particular required at least in the future is a redundant brake system including control electronics, which in an emergency can assume control in the event of a failure of a brake system.

In principle, the electronic parking brake (EPB) can be embodied as a separate apparatus or else be integrated in another apparatus such as, for example, an air preparation apparatus.

The relay valve of the EPM module can be disposed in the EPB or be composed of one or a plurality of external relay valves. When the EPB and the EPM are supplied with compressed air, either the same supply path or a different supply path can be utilized. Should the integrated EPM module be supplied from another path, it is expedient here for a higher pressure level to be used than in the EPB.

It can furthermore be provided that the redundancy compressed air output line by way of the second connector line is able to be supplied, or in the operating state can be supplied, with compressed air by a compressed air source. It is ensured as a result, that braking and operating by way of the second connector line to a compressed air source can be enabled in any case, even when the first compressed air source, or the first supply with compressed air by way of the first connector line, respectively, fails. Overall, a corresponding redundancy of the entire system is enabled as a result.

Moreover, it can be provided that a relay valve for controlling the redundancy compressed air output line is provided upstream of the redundancy compressed air output line (or the redundancy compressed air output, respectively). An actuation of the redundant brake system can take place in the usual manner by means of the bistable valve.

It is furthermore conceivable that the relay valve is configured as a bistable valve. The relay valve, or bistable valve, respectively, in particular enables a rapid and precise actuation of the redundant brake system as a response to a control pressure actuated as an input into said valve.

The relay valve can have a pneumatic control input. A simple and reliable actuation by the pneumatic system of the parking brake device is possible by means of the pneumatic control input. In principle however, it is also conceivable that an electronic actuation of the relay valve is alternatively and/or additionally enabled.

The pneumatic control input can have a supply line in which at least one control valve is provided. Actuating can take place by means of the at least one control valve. In principle, control valves of all types are conceivable here. The control valve can be a solenoid valve.

It can be provided in particular that the control valve is a 2/2-way valve. In principle however, it is also conceivable that control valves of any other type are possible. 3/2-way valves, 4/2-way valves, or else bistable valves are conceivable. This, however, is not mandatory.

A venting line can branch off between the control valve and the control input. The actuation of the pneumatic control input can be correspondingly depressurized by way of the venting line and the control pressure located therein can be discharged.

A further control valve can be provided in the venting line per se. As a result, further possibilities in terms of actuation can be achieved.

The further control valve can in particular be connected to an air discharge and/or be an air discharge valve.

It can moreover be provided that a 3/2-way valve is provided between the control valve and the control input, one output line of said 3/2-way valve being connected to one control input, and the other output line of said 3/2-way valve being connected to a control input of a bistable valve. Actuating a further system is enabled as a result.

The parking brake device can have at least one further compressed air output for connecting to a trailer control module and/or for connecting to at least one spring brake cylinder of a trailer.

It can furthermore be provided that a bistable valve for connecting to a trailer control module and/or for connecting to at least one spring brake cylinder of a trailer is provided upstream of the further compressed air output.

It is also conceivable that a control line in which the 3/2-way valve that is connected to a pneumatic control input of a third control valve is disposed, the latter being disposed in the redundancy output line as well as being connected to a pneumatic control input of a fourth control valve that is disposed between the bistable valve and the further compressed air output, branches off upstream of the control valve. A pneumatic circuit diagram of this type enables the brakes of the trailer and of the redundant brake system to be actuated in a manner independent of the control valves of the trailer bistable valve or relay valve, respectively. Overall, an even higher level of functional reliability can be guaranteed as a result.

Further details and advantages of the invention are now to be explained by means of the exemplary embodiments illustrated in more detail in the drawings.

DETAILED DESCRIPTION OF THE DRAWINGS

Figures 1A, 1B:
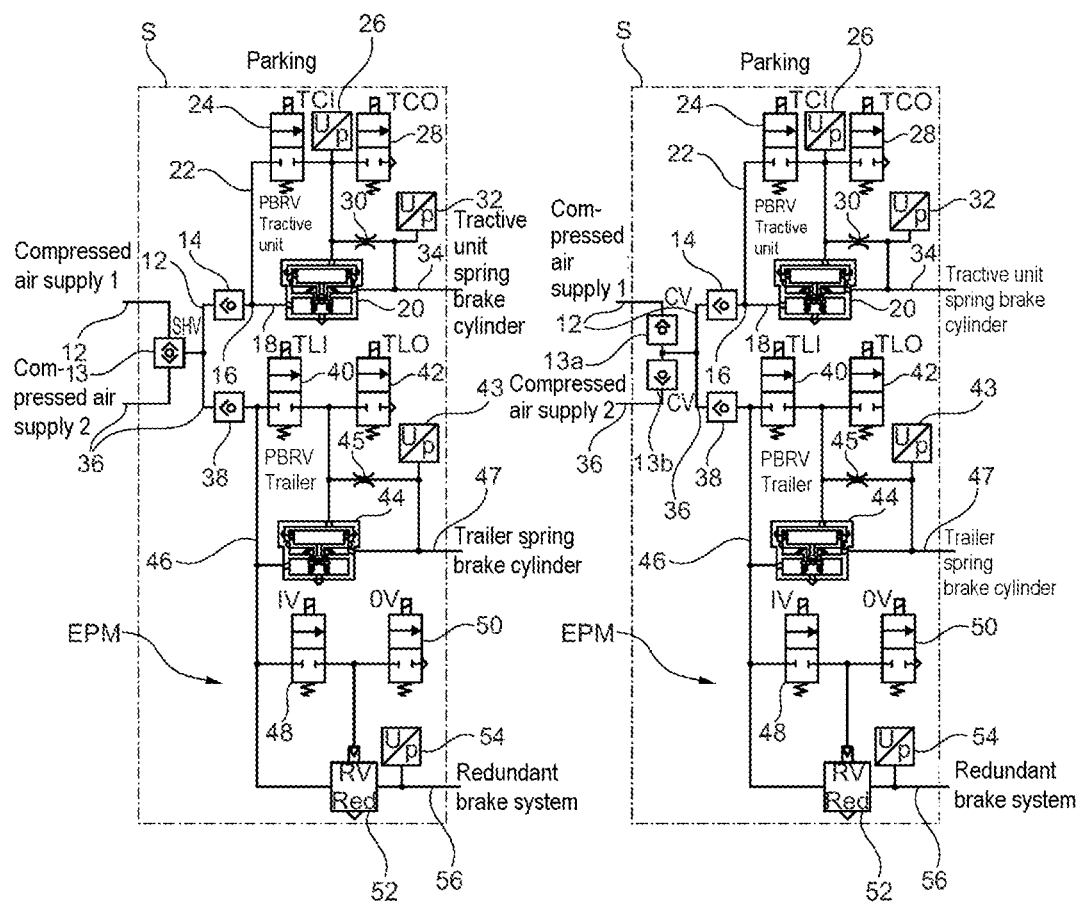
FIG. 1a shows a first exemplary embodiment of a parking brake device according to the invention.
FIG. 1b shows the first exemplary embodiment of the parking brake device according to the invention in a further illustration.

FIG. 1*a* in a schematic illustration shows a first exemplary embodiment of a parking brake device 10*a* according to the invention.

The system limit S of the parking brake device 10*a* here is plotted with a dashed line.

The parking brake device 10*a* has a first compressed air supply 12, or connector line 12, respectively, and a second compressed air supply 36, or connector line 36, respectively.

The first and/or the second compressed air supply 12, 36 here can be disposed on a compressor, for example.

Alternatively or additionally, it can be provided that the first and/or the second compressed air supply 12, 36 are/is supplied by a corresponding connector for a parking brake device of a multiple-circuit protection valve (not shown in FIGS. 1*a*, 1*b*).

The first and the second connector line 12, 36 by way of a switch valve 13 initially converge so as to form a common connector line for supplying the parking brake device 10*a* with compressed air.

The switch valve 13 is designed as a so-called select-high valve 13.

Downstream of the switch valve 13, the common connector line branches off again so as to form the first and the second connector line 12, 36.

A first stop valve 14 is disposed in the first connector line 12, and a second stop valve 38 is disposed in the second connector line 36.

A first branching point 16 where the line 18 branches off to the bistable valve 20 is provided downstream of the stop valve 14.

Moreover, the control line 22 here branches off to the control valves 24 (TCI) and 28 (TCO). The control valve 24 and the control valve 28 here are configured as 2/2-way solenoid valves.

A pressure sensor 26 is provided between the valves 24 and 28.

A control line to the bistable valve 20 for the tractive unit branches off downstream of the control valve 24 and upstream of the valve 28, the actuation of the bistable valve 20 being able to take place pneumatically by means of said control line.

Branching off from this control line is furthermore a further line which has a throttle 30 and also has a pressure sensor 32. This line in turn leads to the output line 34 which is also connected to the valve output of the bistable valve 20.

The compressed air supply 12 here represents the first connector line to a compressed air source.

Furthermore, the second connector line 36 serves for connecting to a further compressed air source. This here can be a compressed air supply independent of the first compressed air source.

However, it is also conceivable that the first and the second connector line 12, 13 are connected to a common compressed air source.

Provided downstream of the stop valve 38 is a line 46 from which connector lines are provided to the control valves 40 and 42, as well as to the bistable valve 44 for the trailer, and to the control valves 48 and 50 for the redundancy relay valve 52 for the connector 56 to the redundant brake system.

The control valves 40 and 42 are likewise configured as 2/2-way solenoid valves.

A control line to the bistable valve 44 for the trailer branches off between the control valve 40 and the control valve 42. In a manner comparable to that of the control line for the bistable valve 20 of the tractive unit, a branch which is provided in an output line for the connector 47 is likewise provided upstream here, wherein the spring brake cylinders of the trailer are connected to the bistable valve 20 by means of this line, or this connector 47, respectively. A pressure sensor 43 and a throttle 45 are provided in this branch.

The control valves 48 and 50 for the redundancy relay valve 52 are likewise embodied as 2/2-way solenoid valves.

A pressure sensor 54 is also provided in the connector line 56 for the redundant brake system.

The circuit diagram of the control valves 48, 50 of the redundancy relay valve 52 and of the pressure sensor 54 configures a functional and structural construction unit which is configured as an electropneumatic modulator EPM for adjusting a redundancy brake pressure at the connector line 56 for the redundant brake system.

The redundant brake system 68 is in particular a component part of a service brake device of a utility vehicle.

The electropneumatic modulator EPM is supplied with compressed air from the line 46 which branches off between the stop valve 38 and the solenoid control valve 40.

A redundant supply of compressed air is made possible as a result of the first connector to a compressed air source 12 (=first connector line 12 to a compressed air source) and the second connector to a compressed air source 36 (=second connector line to a compressed air source). The compressed air sources here can also be mutually independent.

Moreover, in the event of a failure of the first compressed air source, braking of the tractive unit, or else of the trailer, can continue to take place by way of the redundant brake system.

FIG. 1b in a further schematic illustration shows the first exemplary embodiment of the parking brake device 10b, wherein the first exemplary embodiments from FIG. 1a and from 1b differ in that the switch valve 13 from FIG. 1a has been replaced by two functionally equivalent stop valves 13a, 13b in FIG. 1b.

The functional mode of the first exemplary embodiment of the parking brake device 10a,10b according to FIGS. 1a, 1b here is as follows:

For reasons of simplification, the functional mode of the parking brake device 10a, 10b under regular operating conditions, i.e. without taking into account the electropneumatic modulator EPM, is explained first.

The control input of the relay valve 20 of the tractive unit, by means of the two solenoid control valves 24 and 28, can be supplied with air or vented, depending on the desired parking state, this resulting in the spring brake cylinders of the tractive unit being activated or released.

Moreover, an additional connection between the control input and the output of the relay valve 20 can be obtained by way of the branch line in which the throttle 30 is disposed, in that the pressure at the output of the relay valve 20 can be fed back to the control input of the relay valve.

A loss of air in the course of a switching procedure between different operating modes of the parking brake device according to the invention is in particular able to be reduced by means of the combination of the branch line and the throttle 30 provided therein.

A switching procedure between the operating states can thus take place in a more rapid, efficient and precise manner.

In particular, no readjustment of compressed air is necessary as a result of any loss of air being precluded.

According to FIGS. 1a and 1b, the pneumatic circuit diagram of the relay valve 20 for the tractive unit with the control valves 24, 28 is correspondingly constructed in a manner analogous to the pneumatic circuit diagram of the relay valve 44 for the trailer with the control valves 40, 42.

Therefore, the functional explanations above also apply in an analogous manner to the actuation of the relay valve 44 of the trailer by way of the control valves 40, 42 thereof.

The respective pneumatic actuation of the two relay valves 20, 44 for the tractive vehicle and the trailer shown in FIGS. 1a, 1b by way of the respectively assigned control valves 24, 28; 40, 42 takes place in a mutually independent manner.

The tractive unit and the trailer can thus be actuated in a mutually independent manner, this enabling further actuation states such as a trailer test state when stationary, or an anti-jack-knife state during travel.

The functional description hereunder now refers to a defect of the parking brake device 10a, 10b and/or of an electropneumatic service brake device (not shown in FIGS. 1a, 1b).

A defect of this type is present, for example, when the first or the second compressed air supply 12, 36, or connector line 12, 36, respectively, has a leakage or a blockage or any other functional impairment.

In this case, a further supply line or connector line 10a, 10b, respectively, is available (in the service brake device as well as) in the parking brake device 10a, 10b, depending on which of the two lines 12, 36 is defective.

Additionally or alternatively, the service brake device may have a defect of such a type that the latter by virtue of electrical and/or pneumatic impairments becomes partially or completely inoperative.

In this case, the electropneumatic modulator EPM integrated in the parking brake device 10a, 10b configures a redundant brake system by means of which there is still a functional mode similar to that of the relay valve at least in the event of a partial failure of the control electronics of the parking brake device 10a, 10b.

As a result, the electropneumatic modulator EPM can continue to activate the service brake cylinders and/or the parking brake cylinders, this being particularly important in particular in the context of the future safety requirements in terms of autonomous driving or partially autonomous driving.

Figure 2:
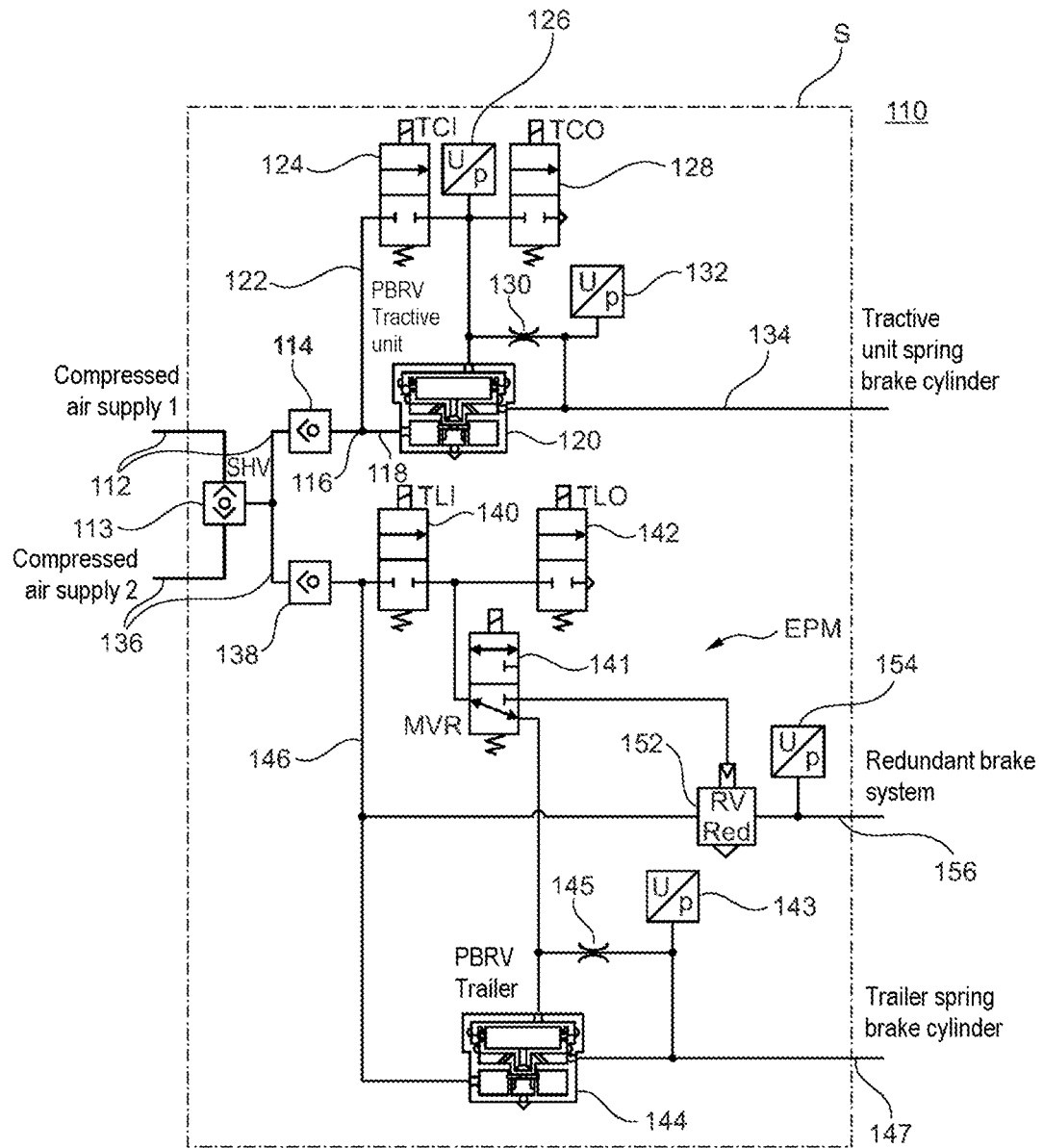
FIG. 2 shows a second exemplary embodiment of a parking brake device according to the invention.

FIG. 2 shows a parking brake device 110 in a second exemplary embodiment of the invention.

The parking brake device 110 according to FIG. 2 has substantially the same structural and functional features as the exemplary embodiment of a parking brake device 10a shown in FIG. 1a.

Identical or similar features or elements are provided with the same reference sign, the latter however being increased by the value 100.

There are, however, the following differences in structural and/or functional terms:

In order for the redundancy relay valve 152 to be actuated, the control valves 140 and 142 which are also utilized for actuating the bistable valve 144 of the trailer are henceforth utilized. To this end, a further 3/2-way valve is provided after the valve 140 in the branch line.

The control valve 141 (MVR) thus serves for actuating the bistable valve 144 as well as for actuating the redundancy relay valve 152.

This embodiment has the advantage that a dual utilization of the valves TLI, TLO 140, 142 is enabled. As a result, an overall simpler construction, saving the cost of a solenoid control valve 48, 50 (see FIGS. 1a, 1b), can be achieved.

The fallback plane for a braking possibility, independent of the first compressed air connector 112, by means of the redundant brake system which is connected to the connector 156 is likewise provided.

The functional mode of the second exemplary embodiment is otherwise substantially identical to that of the first exemplary embodiment according to FIGS. 1a, 1b.

Figure 3:
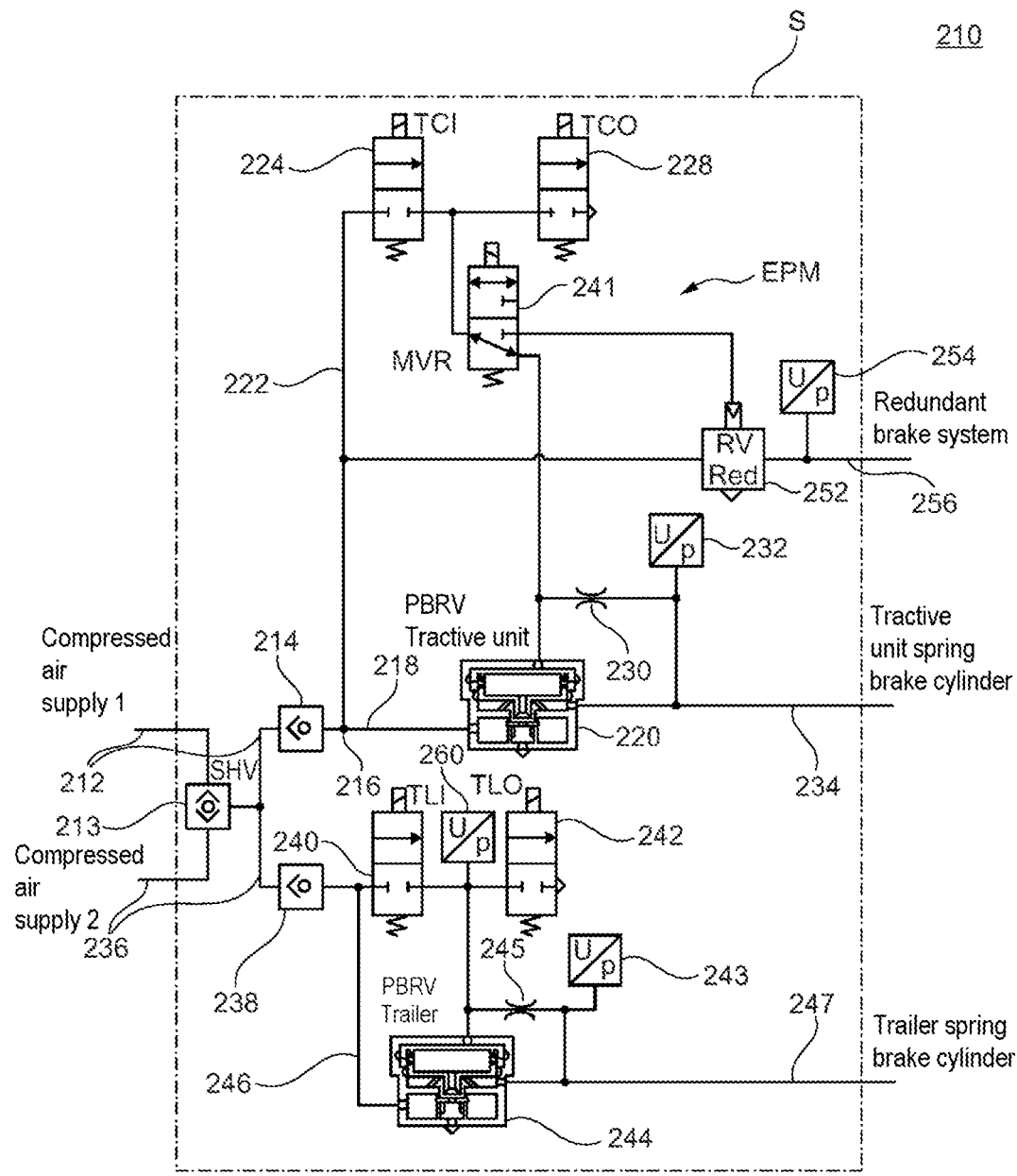
FIG. 3 shows a third exemplary embodiment of a parking brake device according to the invention.

FIG. 3 shows a third exemplary embodiment of a parking brake device 210 which has substantially the same structural and functional features as the exemplary embodiment of the parking brake device 10a shown in FIG. 1a.

Equivalent elements or features are provided with the same reference sign but increased by the value 200.

Here however, the actuation of the redundancy relay valve 252 is implemented by means of the control valves 224 and 228 which also serve for actuating the bistable valve, or the relay valve 220, respectively, of the tractive unit.

In a manner comparable to the solution according to FIG. 2, a 3/2-way valve (MVR) is likewise disposed between the valves 224 and 228, the latter being in each case 2/2-way solenoid valves, said 3/2-way valve being able to be used both for actuating the bistable valve 220 for the tractive unit and the redundancy relay valve 252.

In contrast to FIG. 2 however, the 3/2-way valve here is disposed between the control valves 224 and 228 which actuate the relay valve 220 for the tractive unit, and not (as in FIG. 2) between the control valves 240, 242 for actuating the trailer, wherein the functionality is nevertheless comparable to that of FIG. 2.

The design embodiment and actuation of the relay valve 244 for the trailer is identical to that in the first exemplary embodiment according to FIG. 1a, wherein a pressure sensor 260 is additionally provided between the control valves 240, 242.

The general functional mode of the third exemplary embodiment of the parking brake device 210 is also comparable to that from FIG. 2.

Figure 4:
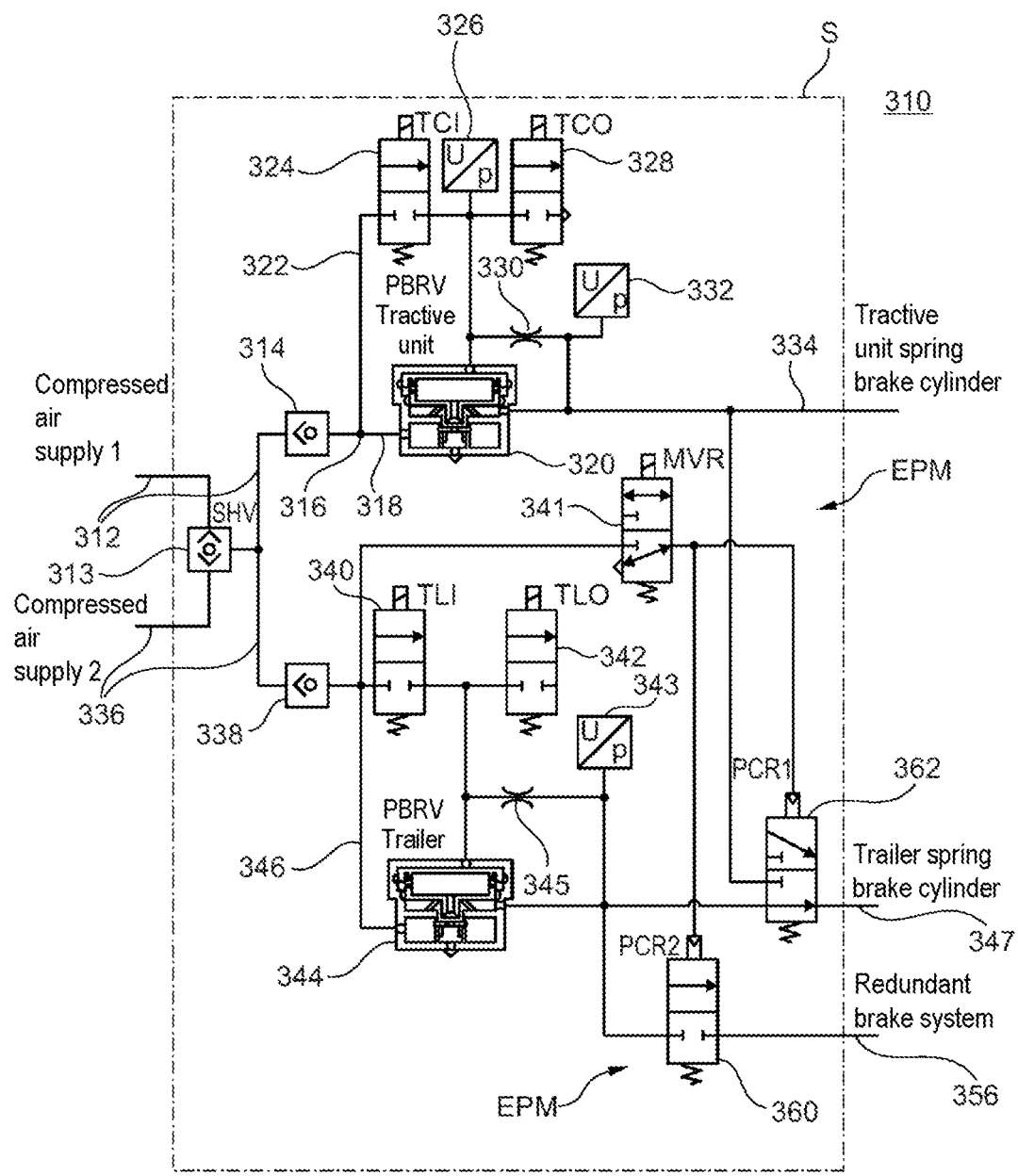
FIG. 4 shows a fourth exemplary embodiment of a parking brake device according to the invention.

FIG. 4 shows a fourth exemplary embodiment of a parking brake device 310 which likewise has substantially the same structural and functional features as the exemplary embodiment shown in FIG. 1a.

Identical elements and features are provided with the same reference signs but increased by the value 300.

There are, however, the following differences:

In principle, the actuation of the bistable valve 320 for the spring brake cylinders of the tractive vehicle and of the valve 344 for the actuation of the trailer is of identical construction to that in the first exemplary embodiment according to FIG. 1a.

However, the valves 360 and 362 (PCR1, PCR2) are additionally provided for actuating the redundant brake system.

The valve 360 here is configured as a 2/2-way solenoid valve which can be pneumatically actuated. The pneumatic actuation of this valve 360, however, takes place only when the 3/2-way valve 341 is in the ventilating switch state thereof (not shown in FIG. 4).

The valve 362, operating as a switchover valve, has a first operating input which by way of the line 334 is fed by means of a branch line, as well as a further input which is fed with compressed air substantially by the bistable valve 344.

By means of this valve 362, it is thus possible to be able to correspondingly actuate the spring brake cylinders of the trailer either by way of the first compressed air supply 312 or the second compressed air supply 336.

Consequently, the valves 360, 362, according to the integration of the latter in the circuit diagram with the 3/2-way valve 341, are either simultaneously supplied with air or vented as a function of whether the 3/2-way valve 341 is switched to the state thereof in which the latter is supplied with air or vented.

Figure 5:
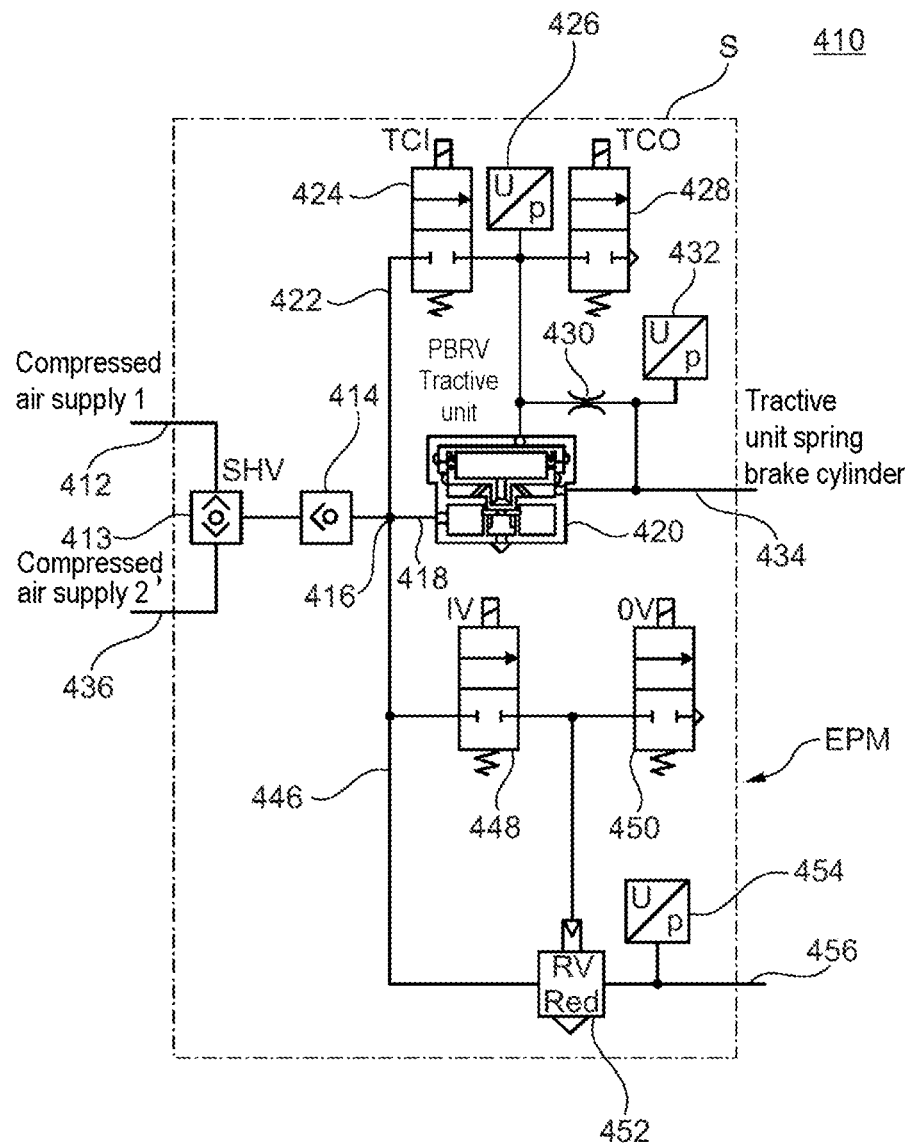
FIG. 5 shows a fifth exemplary embodiment of a parking brake device according to the invention.

FIG. 5 shows a fifth exemplary embodiment of a parking brake device 410. The parking brake device 410 here is constructed so as to be substantially identical to the first exemplary embodiment shown in FIG. 1a.

Equivalent features or elements here are provided with the same reference sign, the latter however being increased by the value 400.

Absent in the exemplary embodiment according to FIG. 5 is only the relay valve 44 for the trailer, as well as the associated control valves 40, 42, and the feedback line to the control input of said relay valve 44, as well as the pressure sensor 43, or the throttle 45, respectively, from FIG. 1a disposed therein.

Furthermore, the fifth exemplary embodiment has only one stop valve 414 for safeguarding the output line 434 of the tractive unit relay valve 420 and the redundancy output line 456.

The exemplary embodiment of a parking brake device 410 shown in FIG. 5 is a so-called "rigid" embodiment which consequently does not provide any actuation possibility for a trailer.

The functionality of the fifth exemplary embodiment of the parking brake device 410 in terms of the tractive unit and of the redundant brake system consequently corresponds to the analogous functionality of the first exemplary embodiment from FIG. 1a for these construction units.

Figure 6:
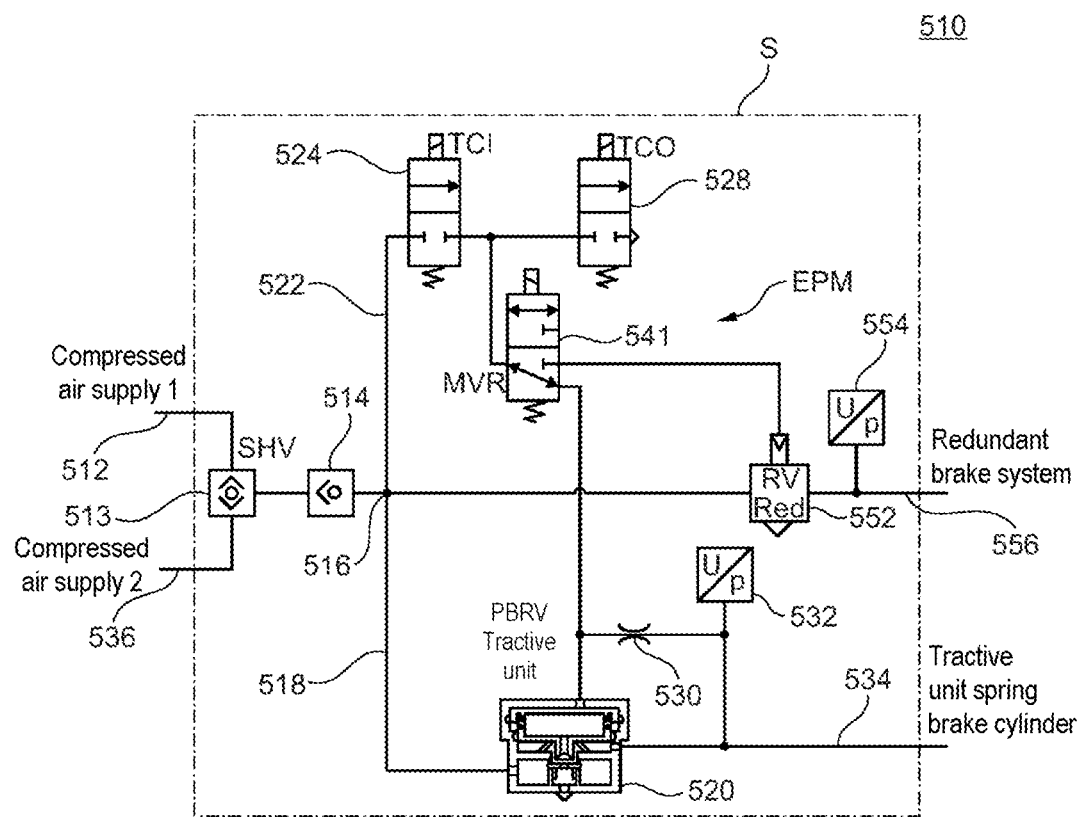
FIG. 6 shows a sixth exemplary embodiment of a parking brake device according to the invention.

FIG. 6 shows a sixth exemplary embodiment of a parking brake device 510 according to the invention.

The parking brake device 510 corresponds substantially to the exemplary embodiment according to FIG. 3, wherein the trailer brake control unit comprising the trailer relay valve 244, having the feedback line to the control input thereof, the associated control valves 240, 242 as well as the pressure sensor 43, or the throttle 45, respectively, disposed therein, in each case from FIG. 3, are absent.

Furthermore, the sixth exemplary embodiment has only one stop valve 514 for safeguarding the output line 534 of the tractive unit relay valve 420 and the redundancy output line 556.

Equivalent features are provided with a reference sign which in comparison to FIG. 3 is increased by the value 300.

The exemplary embodiment of the parking brake device 510 shown in FIG. 6 is also a "rigid" embodiment which likewise does not provide any actuation possibility for a trailer (in comparison to the third exemplary embodiment according to FIG. 3).

The functionality of the sixth exemplary embodiment of the parking brake device 510 in terms of the tractive unit and of the redundant brake system thus corresponds to the analogous functionality of the third exemplary embodiment from FIG. 3 for these construction units.

Figure 7:
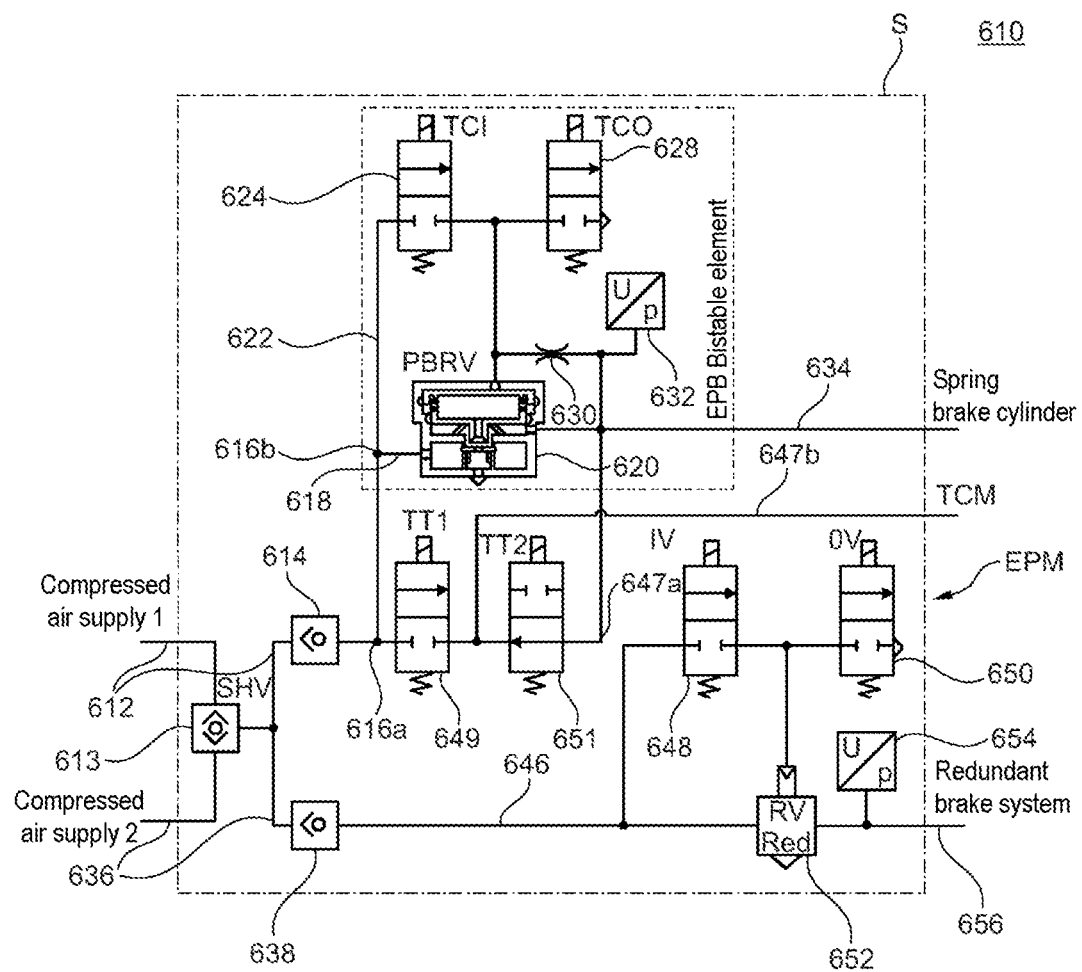
FIG. 7 shows a seventh exemplary embodiment of a parking brake device according to the invention.

FIG. 7 shows a seventh exemplary embodiment of a parking brake device 610 according to the invention.

The parking brake device 610 in terms of construction is based substantially on the first exemplary embodiment according to FIG. 1a, wherein a trailer brake control unit comprising the trailer relay valve 44 having the feedback line to the control input thereof, the associated control valves 40, 42, as well as the pressure sensor 43, or the throttle 45, respectively, according to FIG. 1a, are absent.

Equivalent features are provided with a reference sign which in comparison to FIG. 1a is increased by the value 600.

In comparison to the first exemplary embodiment, the seventh exemplary embodiment has an alternative trailer brake control unit.

This unit comprises two control valves 649, 651 (TT1, TT2) and a branch line 647a which branches off from the branching point 616a between the stop valve 614 and the relay valve 620 for the tractive unit and is connected to the output line 634 of this relay valve 620.

A further output line 647b, which is connected to a trailer control module TCM (not shown in FIG. 7) for actuating the spring brake cylinders of a trailer, branches off between the two control valves 649, 651.

The first control valve 649 is configured as a 2/2-way solenoid valve which is closed when not energized, whereas the second control valve 651 is configured as a 2/2-way solenoid valve which is open when not energized.

The functionality of the seventh exemplary embodiment of the parking brake device 610 in terms of the tractive unit and of the redundant brake system consequently corresponds to the analogous functionality of the first exemplary embodiment from FIG. 1a for these construction units.

In terms of the trailer, the functionality of the sixth exemplary embodiment of the parking brake device 610 here is as follows:

When the control valves 649, 651 are not activated, the output line 647b is actuated by way of the output line 634 of the tractive unit relay valve 620 and the branch line 647a.

The actuation of the trailer control module thus takes place in the same manner as the actuation of the spring brake cylinders of the tractive unit by way of the relay valve 620.

The control valves 649, 651 for setting the so-called trailer test state in which, by switching over the control valves 649, 651 to the respective switched position not illustrated in FIG. 7, the spring brake cylinders of the tractive unit are activated and the spring brake cylinders of the trailer are not activated.

Figure 8:
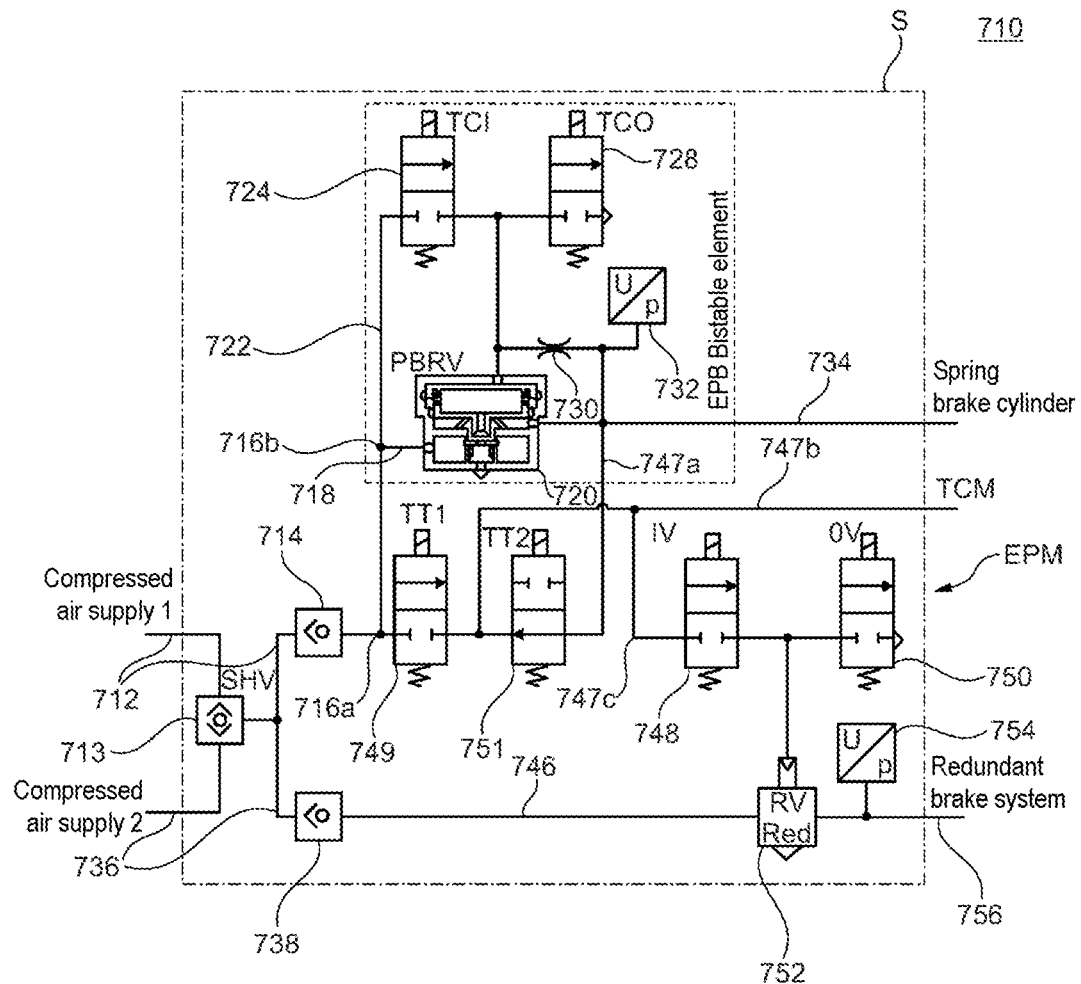
FIG. 8 shows an eighth exemplary embodiment of a parking brake device according to the invention.

FIG. 8 shows an eighth exemplary embodiment of a parking brake device 710 according to the invention.

The parking brake device 710 in terms of construction is based substantially on the seventh exemplary embodiment according to FIG. 7, wherein a control line 747c of the control valve 748 of the electropneumatic modulator EPM does not branch off from the line 746 between the stop valve 738 and the redundancy relay valve 752, but branches off from the output line 747b for the trailer control module.

Equivalent features are provided with a reference sign which in comparison to FIG. 7 is increased by the value 100.

The functionality of the eighth exemplary embodiment of the parking brake device 710 in terms of the tractive unit and of the trailer consequently corresponds to the analogous functionality of the seventh exemplary embodiment from FIG. 7 for these construction units.

Only the actuation of the control valve 748 of the electropneumatic modulator EPM differs in that this control valve 748 is supplied with compressed air only as a function of the controlled pressure output in the output line 734.

This type of circuit diagram enables an additional redundant actuation possibility of the control valve 748, or of the redundancy relay valve 752, respectively.

Figure 9:
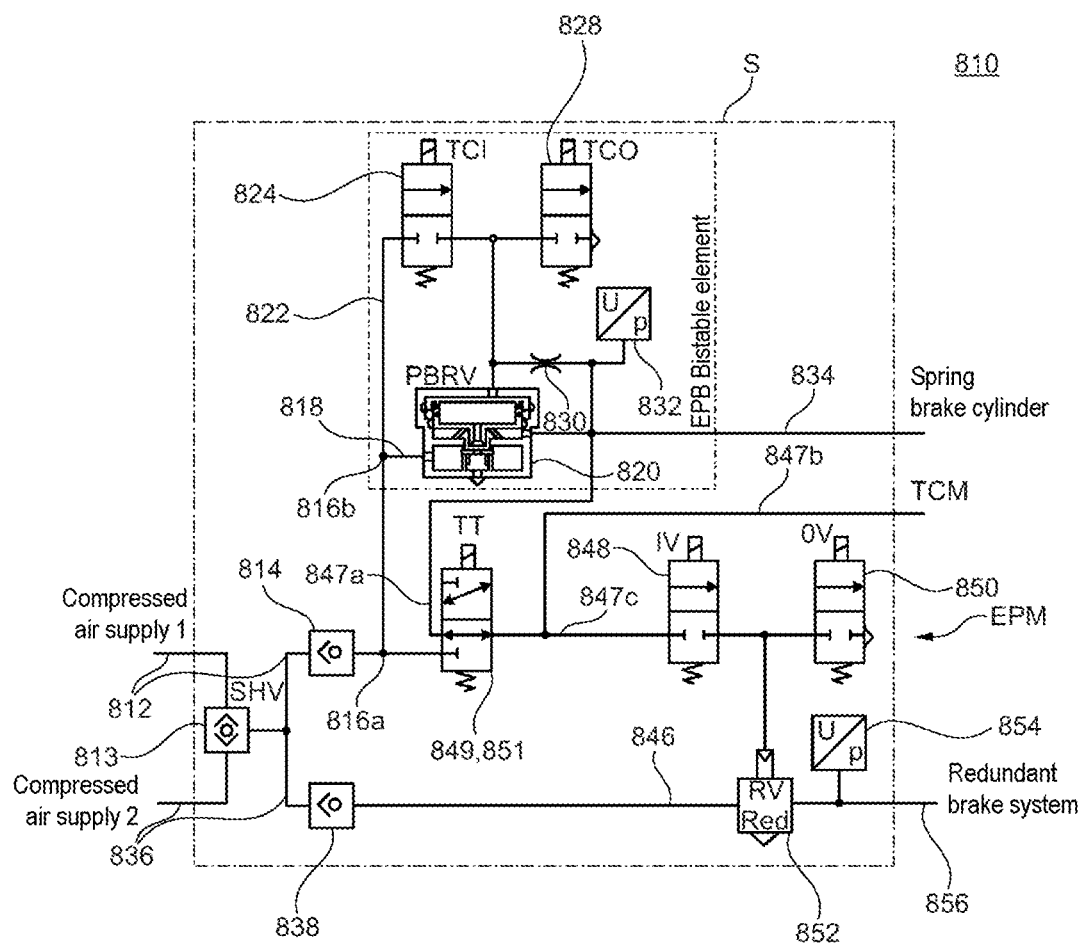
FIG. 9 shows a ninth exemplary embodiment of a parking brake device according to the invention.

FIG. 9 shows a ninth exemplary embodiment of a parking brake device 810 according to the invention.

The parking brake device 810 in terms of construction is based substantially on the eighth exemplary embodiment according to FIG. 8, wherein the two 2/2-way control valve 749, 751 from FIG. 8 have been replaced by a 3/2-way solenoid valve 849, 851.

Equivalent features are provided with a reference sign which in comparison to FIG. 8 is increased by the value 100.

The functionality of the ninth exemplary embodiment of the parking brake device 810 here corresponds to the analogous functionality of the eighth exemplary embodiment from FIG. 8.

Figure 10:
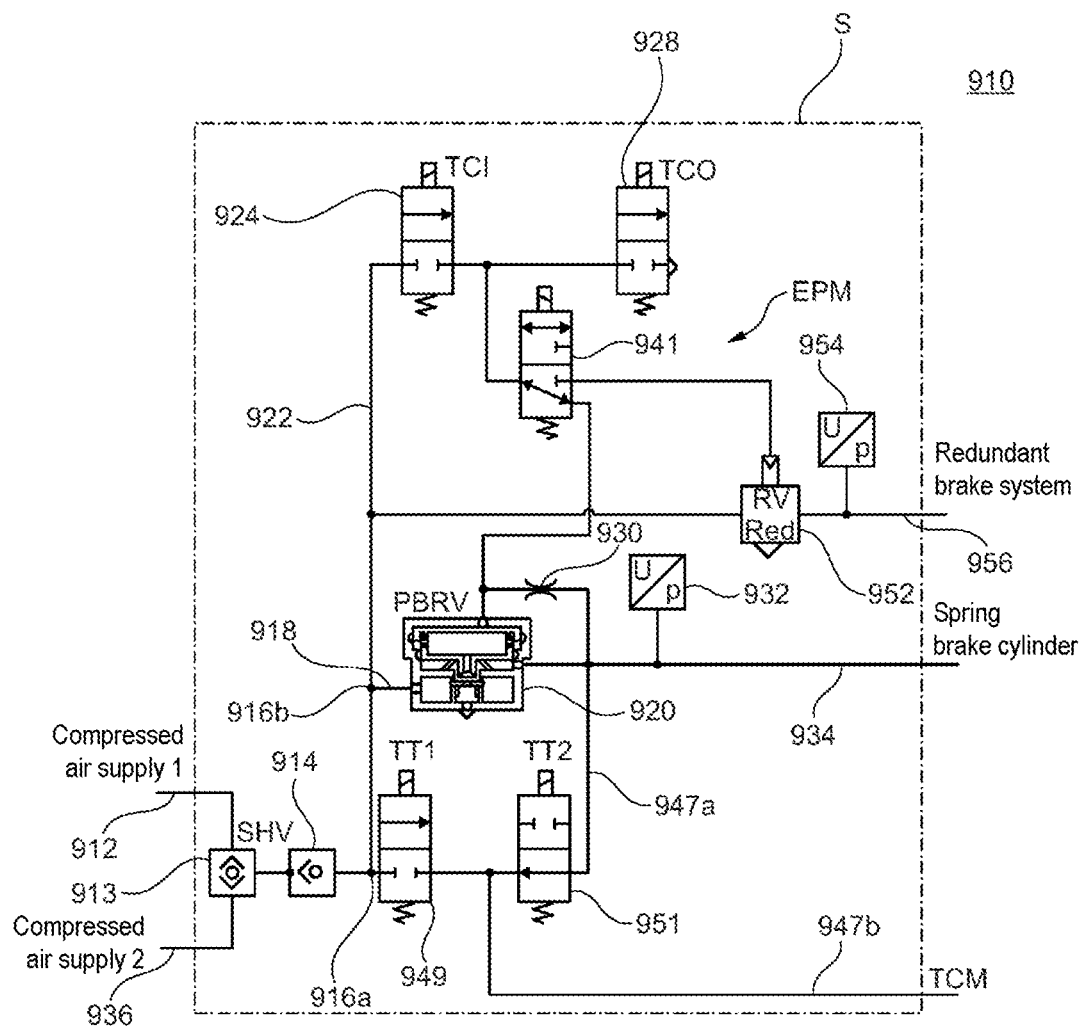
FIG. 10 shows a 10th exemplary embodiment of a parking brake device according to the invention.

FIG. 10 shows a tenth exemplary embodiment of a parking brake device 910 according to the invention.

The parking brake device 910 in terms of construction is based substantially on the seventh exemplary embodiment according to FIG. 7, wherein the electropneumatic modulator EPM is not supplied by the supply line 636 or 646, respectively, as is shown in FIG. 7, but by a dedicated supply line which branches off between the branching point 916b and the control valve 924.

This supply line branches off from the control line 922 the latter per se serving for the tractive unit relay valve 920 and for the redundancy relay valve 952.

Accordingly, the second supply line 646 including the stop valve 638 from the seventh exemplary embodiment according to FIG. 7 can be dispensed with in the tenth exemplary embodiment.

Moreover, according to the tenth exemplary embodiment, the two 2/2-way control valves 648, 650 of the electropneumatic modulator EPM (cf. FIG. 7) have been replaced by a 3/2-way solenoid valve 941.

This 3/2-way solenoid valve 941 is disposed in the control line between the control valves 924, 928 and the relay valve 920.

A further control line for actuating the redundancy relay valve 952 branches off from the 3/2-way solenoid valve 941.

The further equivalent features are provided with a reference sign which in comparison to FIG. 7 is increased by the value 300.

The control valves 924 and 928 thus have a double control functionality because said control valves 924 and 928 by way of the 3/2-way solenoid valve 941 actuate the relay valve 920 for the tractive unit as well as the redundancy relay valve 952.

However, the switched position of the 3/2-way solenoid valve 941 determines whether the control valves 924, 928 actuate the relay valve 920 for the tractive unit or the redundancy relay valve 952.

The functionality of the tenth exemplary embodiment of the parking brake device 910 (in the switched position of the 3/2-way solenoid valve 941 shown in FIG. 10) in terms of the tractive unit and of the trailer corresponds to the analogous functionality of the seventh exemplary embodiment from FIG. 7 for these construction units.

In the event of a defect and/or a (partial) failure of an electronic brake system of a utility vehicle, the 3/2-way solenoid valve 941 can be switched over to the switched position not shown in FIG. 10, thus enabling the actuation of a redundant brake system by way of the control valves 924, 928 of the parking brake device 910.

Figure 11:
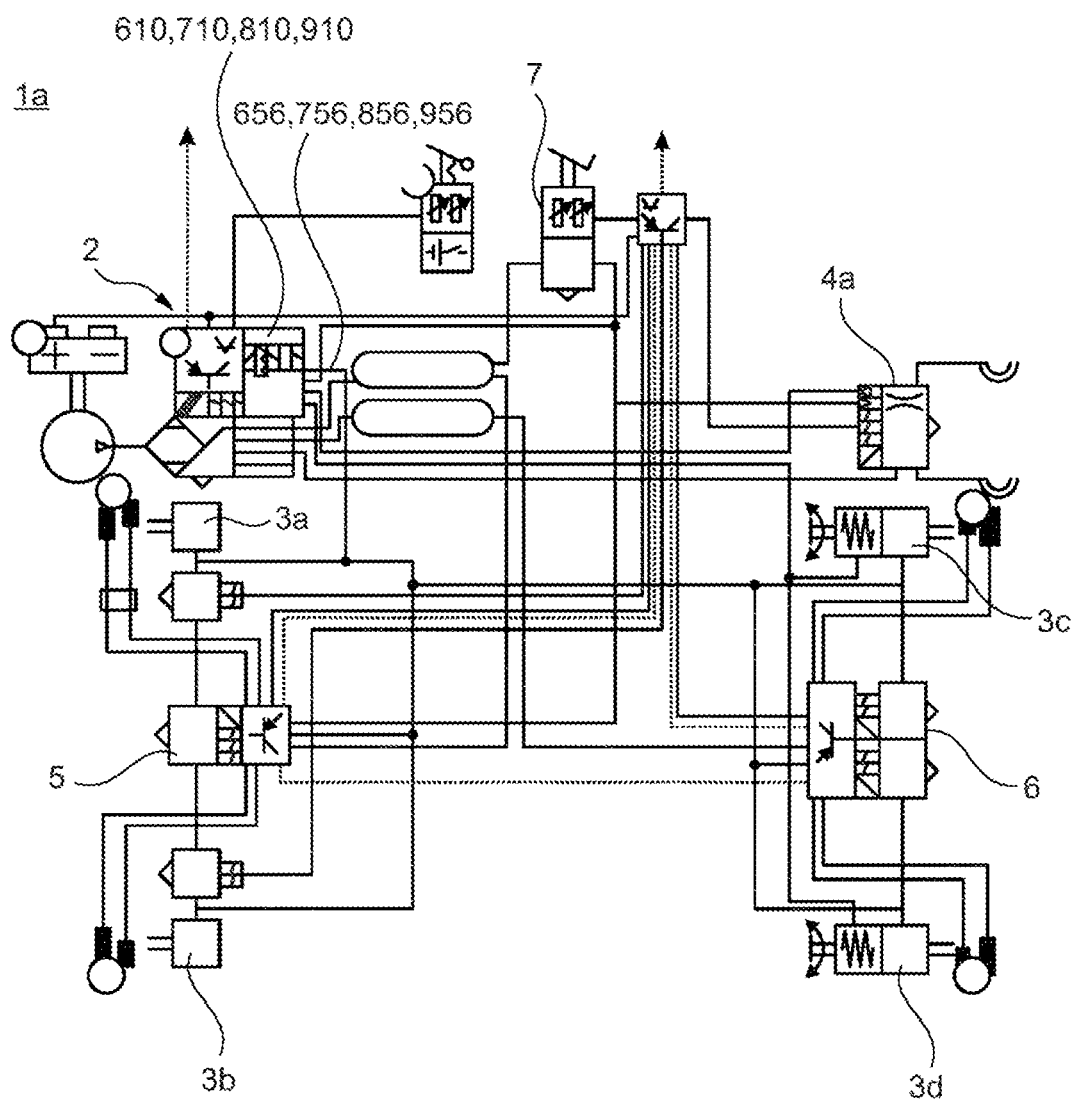
FIG. 11 shows a first exemplary embodiment of an electronic brake system according to the invention, having a parking brake device according to the invention and according to FIGS. 7 to 10.

FIG. 11 shows a first exemplary embodiment of an electronic brake system 1a according to the invention of a utility vehicle, having a parking brake device 610, 710, 810, 910 according to the invention and according to FIGS. 7 to 10.

The brake system 1a has an air preparation unit 2 which furthermore comprises the parking brake device 610, 710, 810, 910 according to the invention and according to FIGS. 7 to 10.

However, it is not absolutely necessary for the parking brake device 610, 710, 810, 910 to be a component part of the air preparation unit 2.

Rather, the parking brake device 610, 710, 810, 910 can also be embodied as a separate device.

The parking brake device 610, 710, 810, 910 by way of the redundancy output line, or the redundancy output connector 656, 756, 856, 956, respectively, by way of corresponding lines is connected directly to the service brake cylinders 3a, 3b of the front axle of a utility vehicle.

Additionally or alternatively, the parking brake device 610, 710, 810, 910 by way of the redundancy output line, or the redundancy output connector 656, 756, 856, 956, respectively, by way of corresponding lines is connected directly to the service brake cylinders 3c, 3d of the rear axle of a utility vehicle.

Provided as a result is a conceivable embodiment of a redundant brake system, i.e. the existing service brake cylinders on the front and/or rear axle, in addition to the existing actuation, are provided with a further redundant actuation as has been described above.

In principle, it would also be conceivable for additional operating brake cylinders to still be provided, the latter alternatively or additionally being connected or attached to the redundancy output connectors.

Alternatively or additionally, it is conceivable that the parking brake device 610, 710, 810, 910 is connected to the corresponding service brake cylinders 3a, 3b, 3c, 3d only by way of an electropneumatic 1-channel modulator 5 of the front axle and/or by way of an electropneumatic 2-channel modulator 6 of the rear axle.

The brake system 1a furthermore has a trailer control module 4a which is connected to the parking brake device 610, 710, 810, 910.

A dedicated trailer relay valve 44, 144, 244, 344 according to the first, second, third and fourth exemplary embodiment of the parking brake device 10a, 10b, 110, 210, 310 can thus be dispensed with.

Alternatively, it is conceivable for the trailer control module 4a to be dispensed with and for the parking brake device 10a, 10b, 110, 210, 310 according to the first, second, third or fourth exemplary embodiment, respectively, to be instead provided in the brake system 1a.

Furthermore, the electronic brake system 1a has a foot brake module 7 which by way of a compressed air vessel is connected to the air preparation module 2 and furthermore is connected to the electropneumatic 1-channel modulator 5 and/or the electropneumatic 2-channel modulator 6 for actuating the service brake cylinders 3a, 3b, 3c, 3d.

Figure 12:
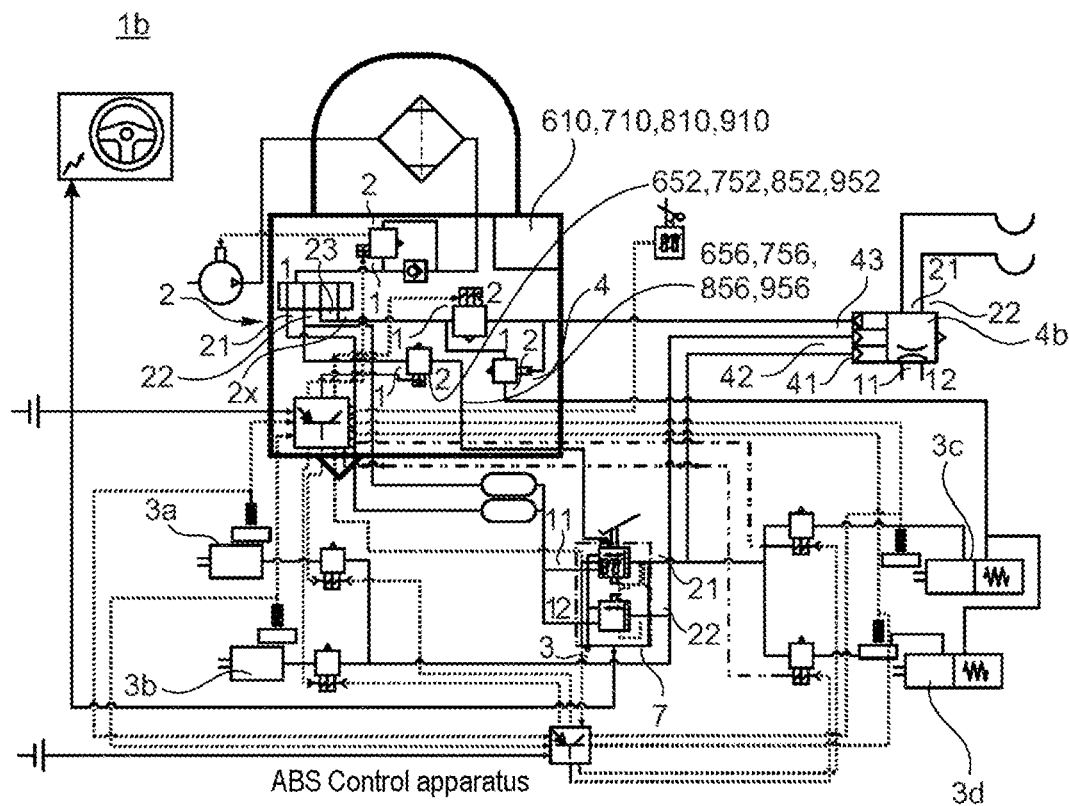
FIG. 12 shows a second exemplary embodiment of an electronic brake system according to the invention, having a parking brake device according to the invention and according to FIGS. 7 to 10.

FIG. 12 shows a second exemplary embodiment of an electronic brake system 1b according to the invention of a utility vehicle, having a parking brake device 610, 710, 810, 910 according to the invention and according to FIGS. 7 to 10.

The brake system 1b has an air preparation unit 2 which furthermore comprises the parking brake device 610, 710, 810, 910 according to the invention and according to FIGS. 7 to 10.

However, it is not absolutely necessary for the parking brake device 610, 710, 810, 910 to be a component part of the air preparation unit 2.

Rather, the parking brake device 610, 710, 810, 910 can also be embodied as a separate device.

The focus of the illustration of the second exemplary embodiment of the brake system 1b lies in illustrating where the redundancy relay valve 652, 752, 852, 952 is disposed in relation to the parking brake device 610, 710, 810, 910 in the brake system 1b.

According to FIG. 12, the redundancy relay valve 652, 752, 852, 952 is disposed in an air preparation unit 2 but provided so as to be outside the parking brake device 610, 710, 810, 910.

The redundancy output line 656, 756, 856, 956 by way of a redundant compressed air input on the foot brake module 7 is connected to a foot brake module 7 for actuating the service brake cylinders 3a, 3b, 3c, 3d for the front and rear axle of a utility vehicle.

Should the brake system 1b in the future be an autonomous brake system, this foot brake module 7 can be dispensed with and replaced by an automatic pressure regulator module for the front and rear axle that by way of a corresponding redundant compressed air input is supplied by the redundancy output line 656, 756, 856, 956.

The brake system 1a furthermore has a trailer control module 4b which is connected to the parking brake device 610, 710, 810, 910.

A dedicated trailer relay valve 44, 144, 244, 344 according to the first, second, third and fourth exemplary embodiment of the parking brake device 10a, 10b, 110, 210, 310 can thus be dispensed with.

Alternatively, it is conceivable for the trailer control module 4 to be dispensed with and for the parking brake device 10a, 10b, 110, 210, 310 according to the first, second, third or fourth exemplary embodiment, respectively, to be instead provided in the brake system 1a.

Figure 13:
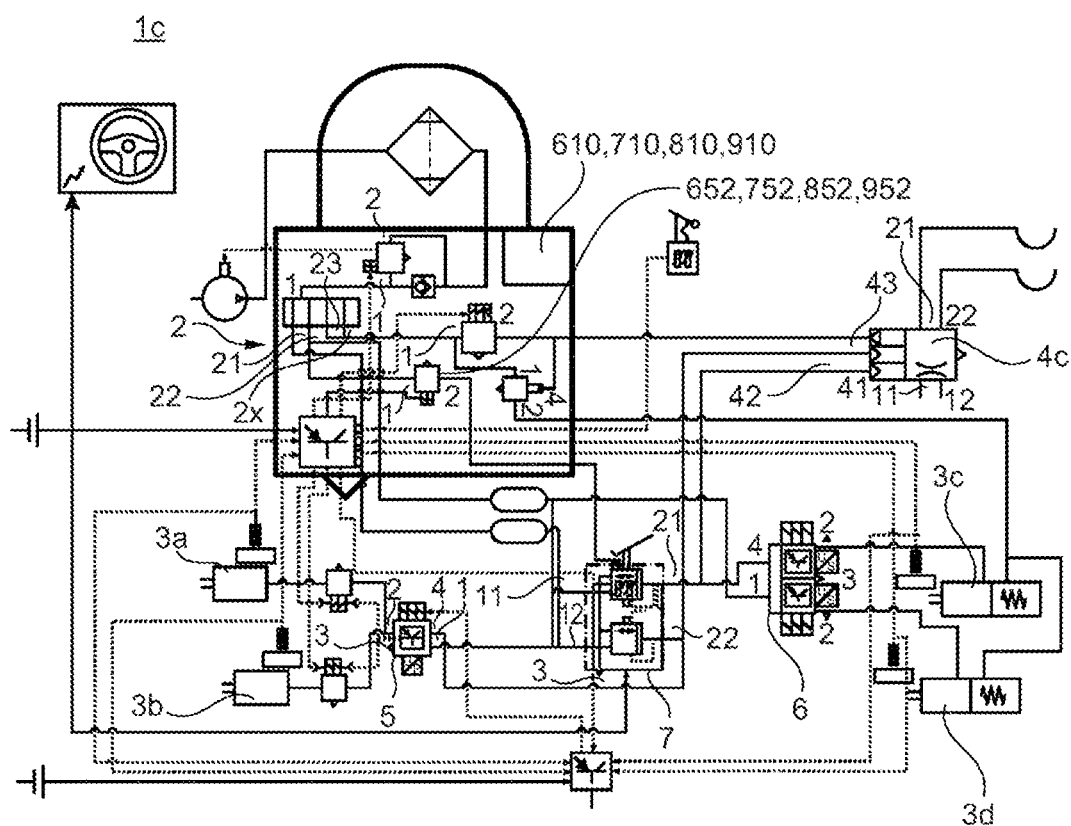
FIG. 13 shows a third exemplary embodiment of an electronic brake system according to the invention, having a parking brake device according to the invention and according to FIGS. 7 to 10.

FIG. 13 shows a third exemplary embodiment 1c of an electronic brake system according to the invention of a utility vehicle, having a parking brake device according to the invention and according to FIGS. 7 to 10.

The third exemplary embodiment 1c of this brake system in terms of construction is based substantially on the second exemplary embodiment 1b of the electronic brake system, wherein this third exemplary embodiment between the service brake cylinders 3a, 3b of the front axle and the foot brake module 7 additionally has an electropneumatic 1-channel modulator 5.

Furthermore, the third exemplary embodiment between the brake cylinders 3c, 3d of the rear axle and the foot brake module 7 additionally has an electropneumatic 2-channel modulator 6.

The further features of the third exemplary embodiment 1c correspond substantially to those of the second exemplary embodiment 1b.

Figure 14:
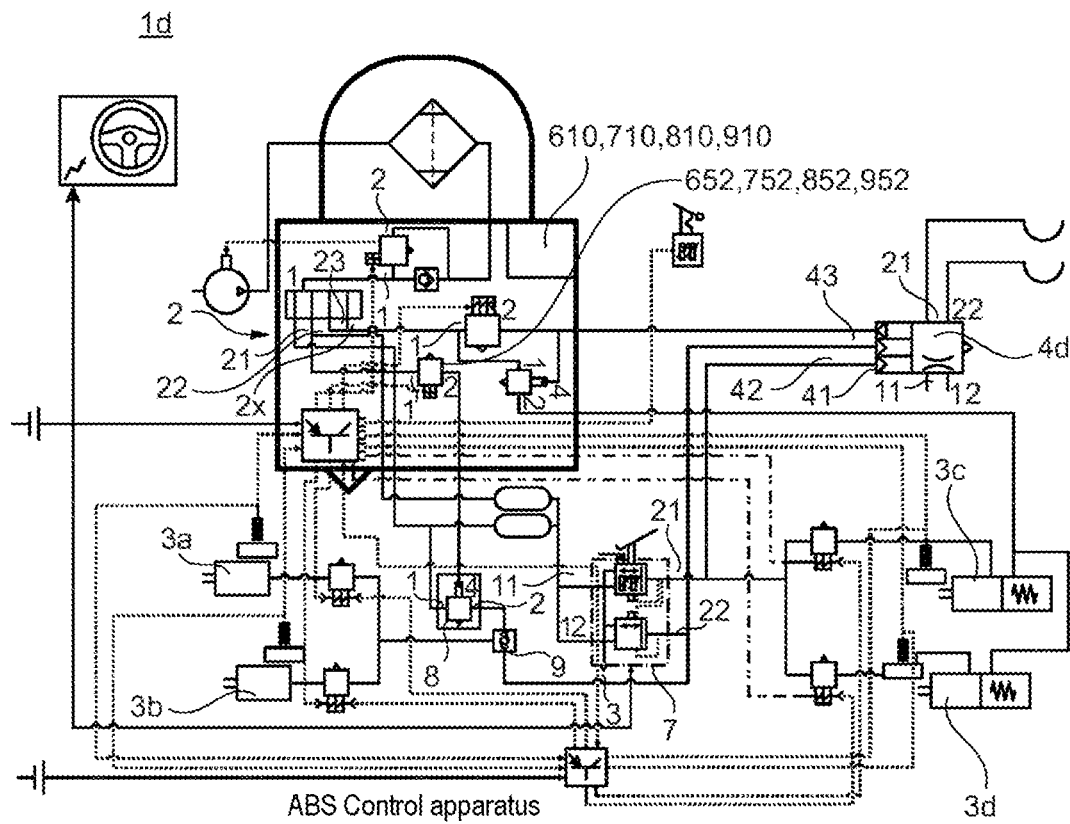
FIG. 14 shows a fourth exemplary embodiment of an electronic brake system according to the invention, having a parking brake device according to the invention and according to FIGS. 7 to 10.

FIG. 14 shows a fourth exemplary embodiment 1d of an electronic brake system according to the invention of a utility vehicle, having a parking brake device according to the invention and according to FIGS. 7 to 10.

The fourth exemplary embodiment of this brake system 1d in terms of construction is based substantially on the second exemplary embodiment 1b of the electronic brake system, wherein the redundancy relay valve 652, 752, 852, 952 is connected to a pneumatic control input of a further external redundancy relay valve 8.

This relay valve 8 according to FIG. 14 is disposed outside the air preparation unit 2.

Furthermore, this relay valve 8 by means of an operating input thereof is connected to a service brake circuit, and by way of the operating output thereof and by way of a select-high valve 9 is fed back to this service brake circuit.

This feedback takes place at the select-high valve 9 which in the aforementioned service brake circuit is disposed between the foot brake module 7 and the service brake cylinders 3a, 3b of the front axle.

Figure 15:
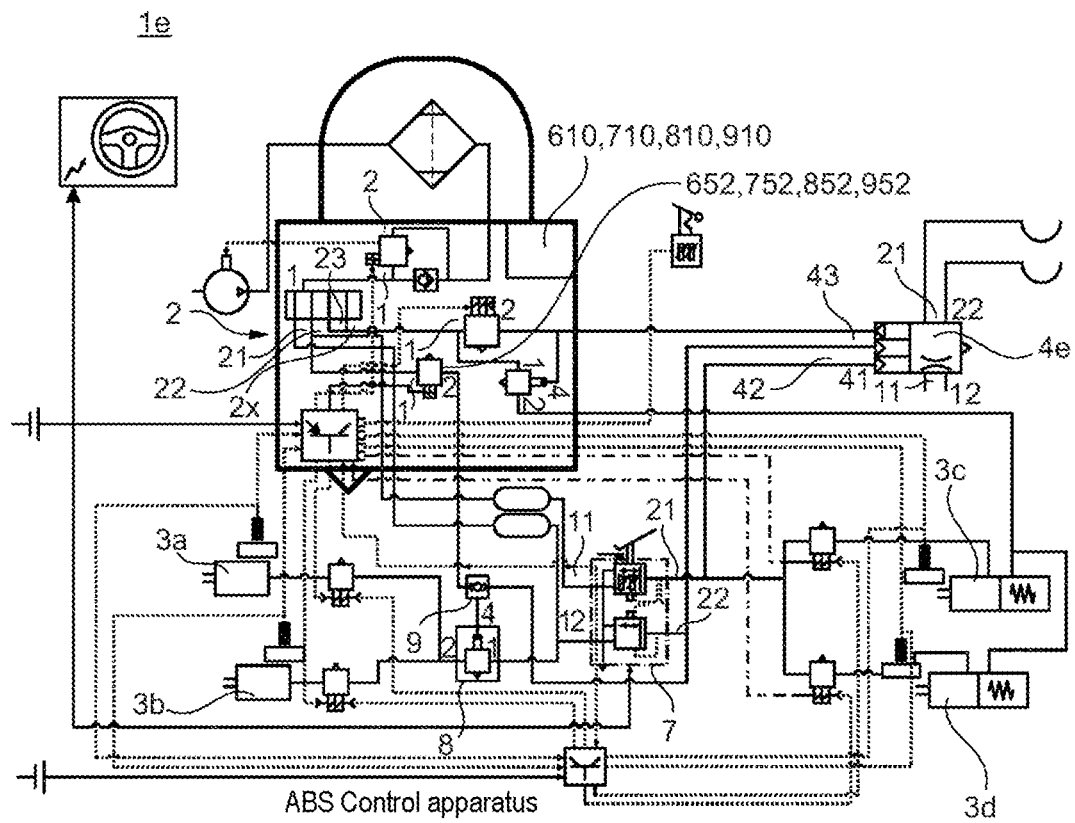
FIG. 15 shows a fifth exemplary embodiment of an electronic brake system according to the invention, having a parking brake device according to the invention and according to FIGS. 7 to 10.

FIG. 15 shows a fifth exemplary embodiment of an electronic brake system 1e according to the invention of a utility vehicle, having a parking brake device according to the invention and according to FIGS. 7 to 10.

The fifth exemplary embodiment of this brake system 1e in terms of construction is based substantially on the fourth exemplary embodiment of the electronic brake system 1d, wherein the further external redundancy relay valve 8 is supplied with compressed air from a supply line which branches off upstream of the foot brake module 7 and is connected to the two service brake cylinders 3a, 3b of the front axle.

The select-high valve 9 by way of the output thereof, according to the fifth exemplary embodiment of this brake system 1e, is connected to a pneumatic control input of the external redundancy relay valve 8.

This relay valve 8 according to FIG. 15 is likewise disposed outside the air preparation unit 2.

Furthermore, a first input of the select-high valve 9 is connected to the redundancy relay valve 652, 752, 852, 952, and a second input of the select-high valve 9 is connected to the operating output of the foot brake module 7.

Figure 16:
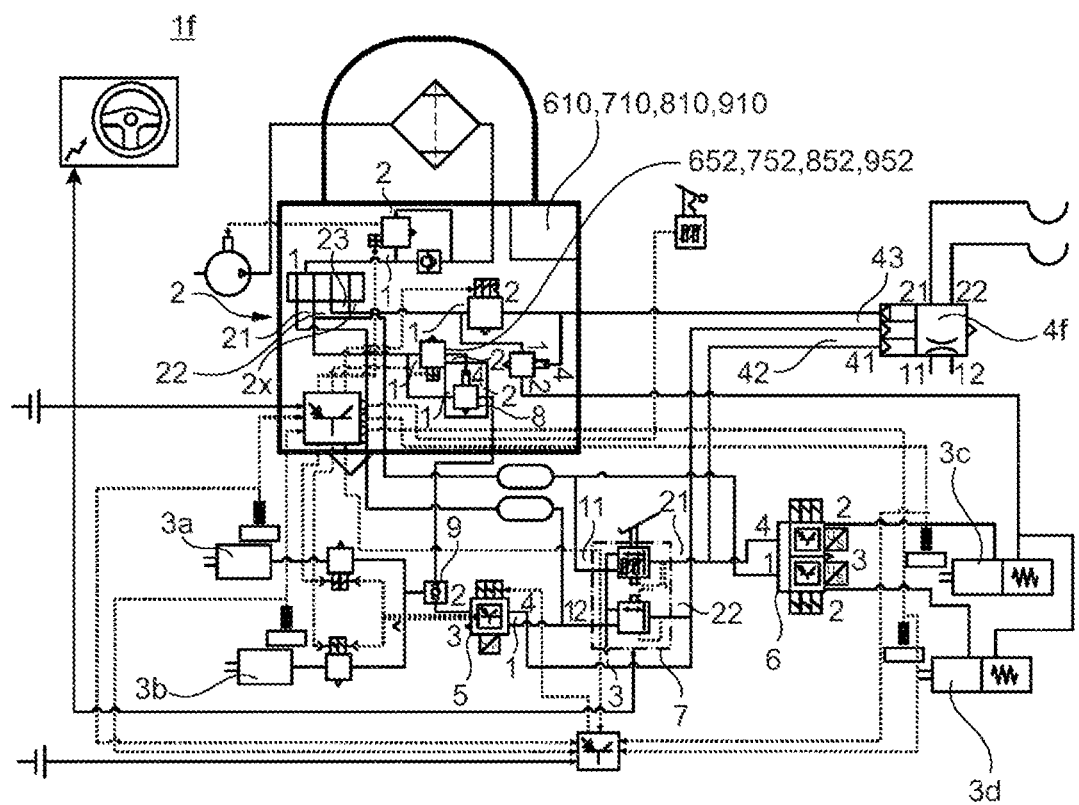
FIG. 16 shows a sixth exemplary embodiment of an electronic brake system according to the invention, having a parking brake device according to the invention and according to FIGS. 7 to 10.

FIG. 16 shows a sixth exemplary embodiment of an electronic brake system 1f according to the invention of a utility vehicle, having a parking brake device according to the invention and according to FIGS. 7 to 10.

The sixth exemplary embodiment 1f in terms of construction is based substantially on the third and fourth exemplary embodiment of the brake system 1c, 1d, wherein, in contrast thereto, the select-high valve 9 is disposed between an electropneumatic 1-channel modulator 5 and the service brake cylinders 3a, 3b of a front axle of the utility vehicle.

Accordingly, a first input of the select-high valve 9 is connected to the output of the electropneumatic 1-channel modulator 5, whereas a second input of the select-high valve 9 is connected to the further redundancy relay valve 8.

This further redundancy relay valve 8 according to the sixth exemplary embodiment 1f is a component part of the air preparation unit 2 and is connected to the same compressed air supply line (of a multiple-circuit protection valve) as the redundancy relay valve 652, 752, 852, 952.

The output of the select-high valve 9 according to FIG. 16 is connected to the two service brake cylinders 3a, 3b of the front axle of a utility vehicle.

LIST OF REFERENCE SIGNS

1a Electronic brake system
1b Electronic brake system
1c Electronic brake system
1d Electronic brake system
1e Electronic brake system
1f Electronic brake system
2 Air preparation unit
3a Service brake cylinder
3b Service brake cylinder
3c Service brake cylinder
3d Service brake cylinder
4a Trailer control module
4b Trailer control module
4c Trailer control module
4d Trailer control module
4e Trailer control module
4f Trailer control module
5 Electropneumatic 1-channel modulator
6 Electropneumatic 2-channel modulator
7 Foot brake module
8 Redundancy relay valve
9 Select-high valve
10a Parking brake device
10b Parking brake device
12 Compressed air supply, or connector line, respectively
13 Select-high valve
13a Stop valve
13b Stop valve
14 Stop valve
16 Branching point
18 Line
20 Bistable valve
22 Control line
24 Control valve
26 Pressure sensor
28 Control valve
30 Throttle
32 Pressure sensor
34 Output line
36 Connector line
38 Stop valve
40 Control valve
42 Control valve
43 Pressure sensor
44 Bistable valve
45 Throttle
46 Line
47 Trailer output connector
48 Control valve
50 Control valve
52 Redundancy relay valve
54 Pressure sensor
56 Connector
110 Parking brake device
112 Compressed air supply
113 Select-high valve
114 Stop valve
116 Branching point
118 Line
120 Bistable valve
122 Control line
124 Control valve
126 Pressure sensor
128 Control valve
130 Throttle
132 Pressure sensor
134 Output line
136 Connector line
138 Stop valve
140 Control valve
141 3/2-way solenoid control valve
142 Control valve
143 Pressure sensor
144 Bistable valve
145 Throttle
146 Line
147 Trailer output connector
152 Redundancy relay valve
154 Pressure sensor
156 Connector
210 Parking brake device
212 Compressed air supply
213 Select-high valve
214 Stop valve
216 Branching point
218 Line
220 Bistable valve
222 Control valve
224 Control valve
228 Control valve
230 Throttle
232 Pressure sensor
234 Output line
236 Connector line
238 Stop valve
240 Control valve
241 3/2-way solenoid control valve
242 Control valve
243 Pressure sensor
244 Bistable valve
245 Throttle
246 Line
247 Trailer output connector
252 Redundancy relay valve
254 Pressure sensor
256 Connector
260 Pressure sensor
310 Parking brake device
312 Compressed air supply
313 Select-high valve
314 Stop valve
316 Branching point
318 Line 320 Bistable valve
322 Control line
324 Control valve
326 Pressure sensor
328 Control valve
330 Throttle
332 Pressure sensor
334 Output line
336 Connector line
338 Stop valve
340 Control valve
341 3/2-way solenoid control valve
342 Control valve
343 Pressure sensor
344 Bistable valve
345 Throttle
346 Line
347 Trailer output connector
356 Connector
360 Valve
362 Valve
410 Parking brake device
412 Compressed air supply
413 Select-high valve
414 Stop valve
416 Branching point
418 Line
420 Bistable valve
422 Control line
424 Control valve
426 Pressure sensor
428 Control valve
430 Throttle
432 Pressure sensor
434 Output line
436 Connector line
446 Line
448 Control valve
450 Control valve
452 Redundancy relay valve
454 Pressure sensor
456 Connector
510 Parking brake device
512 Compressed air supply
513 Select-high valve
514 Stop valve
516 Branching point
518 Line
520 Bistable valve
522 Control line
524 Control valve
528 Control valve
530 Throttle
532 Pressure sensor
534 Output line
536 Connector line
546 Line
548 Control valve
550 Control valve
552 Redundancy relay valve
554 Pressure sensor
556 Connector
610 Parking brake device
612 Compressed air supply
613 Select-high valve
614 Stop valve
616a Branching point
616b Branching point
618 Line
620 Bistable valve
622 Control line
624 Control valve
628 Control valve
630 Throttle
632 Pressure sensor
634 Output line
636 Connector line
638 Stop valve
646 Line
647a Branch line
647b Further output line
648 Control valve
649 Control valve
650 Control valve
651 Control valve
652 Redundancy relay valve
654 Pressure sensor
656 Connector
710 Parking brake device
712 Compressed air supply
713 Select-high valve
714 Stop valve
716a Branching point
716b Branching point
718 Line
720 Bistable valve
722 Control line
724 Control valve
728 Control valve
730 Throttle
732 Pressure sensor
734 Output line
736 Connector line
738 Stop valve
746 Line
747a Branch line
747b Further output line
747c Control line
748 Control valve
749 Control valve
750 Control valve
751 Control valve
752 Redundancy relay valve
754 Pressure sensor
756 Connector
810 Parking brake device
812 Compressed air supply
813 Select-high valve
814 Stop valve
816a Branching point
816b Branching point
818 Line
820 Bistable valve
822 Control line
824 Control valve
828 Control valve
830 Throttle
832 Pressure sensor
834 Output line
836 Connector line
838 Stop valve
846 Line
847a Branch line
847b Further output line 847c Control line
848 Control valve
849 3/2-way solenoid control valve
850 Control valve
851 3/2-way solenoid control valve
852 Redundancy relay valve
854 Pressure sensor
856 Connector
910 Parking brake device
912 Compressed air supply
913 Select-high valve
914 Stop valve
916a Branching point
916b Branching point
918 Line
920 Bistable valve
922 Control line
924 Control valve
928 Control valve
930 Throttle
932 Pressure sensor
934 Output line
936 Connector line
941 3/2-way solenoid control valve
947a Branch line
947b Further output line
949 Control valve
951 Control valve
952 Redundancy relay valve
954 Pressure sensor
956 Connector
S System limit
EPM Electropneumatic modulator

What is claimed is:

1. A parking brake device, comprising:
at least one first connector line to a compressed air source;
at least one second connector line to a compressed air source;
at least one first compressed air output line for connecting directly and/or indirectly to a spring brake cylinder;
at least one further redundancy compressed air output line for connecting directly and/or indirectly to a redundant brake system; and
a relay valve for controlling the redundancy compressed air output line is provided upstream of the redundancy compressed air output line, wherein the relay valve is configured as a bistable valve, wherein the relay valve has a pneumatic control input, wherein the pneumatic control input has a supply line in which at least one control valve is provided, and wherein a venting line branches off between the control valve and the control input.

2. The parking brake device as claimed in claim 1, wherein the redundancy compressed air output line by way of the second connector line is able to be supplied with compressed air by a compressed air source.

3. The parking brake device as claimed in claim 1, wherein the control valve is a 2/2-way valve.

4. The parking brake device as claimed in claim 1, wherein a further control valve is provided in the venting line.

5. The parking brake device as claimed in claim 4, wherein the further control valve is a 2/2-way valve.

6. The parking brake device as claimed in claim 5, wherein the further control valve is connected to an air discharge and/or is an air discharge valve.

7. The parking brake device as claimed in claim 1, further comprising:
a 3/2-way valve provided between the control valve and the control input, one output line of said 3/2-way valve being connected to one control input, and the other output line of said 3/2-way valve being connected to a control input of a bistable valve.

8. The parking brake device as claimed in claim 1, further comprising at least one further compressed air output for connecting to a trailer control module and/or for connecting to at least one spring brake cylinder of a trailer.

9. The parking brake device as claimed in claim 8, further comprising:
a bistable valve for connecting to the trailer control module and/or for connecting to the at least one spring brake cylinder of the trailer, provided upstream of the further compressed air output.

10. The parking brake device as claimed in claim 9, wherein a control line in which a 3/2-way valve that is connected to a pneumatic control input of a third control valve is disposed, the latter being disposed in the redundancy output line as well as being connected to a pneumatic control input of a fourth control valve that is disposed between the bistable valve and the further compressed air output, branches off upstream of the control valve.

* * * * *